United States Patent
Chang et al.

(10) Patent No.: US 9,958,722 B2
(45) Date of Patent: May 1, 2018

(54) PIXEL STRUCTURE HAVING TRUNK OVERLAPPING DATA LINES AND LIQUID CRYSTAL DISPLAY AND ELECTRONIC APPARATUS USING THE PIXEL STRUCTURE

(71) Applicant: Shenzhen China Star Optoelectronics Technology Co., Ltd., Shenzhen, Guangdong (CN)

(72) Inventors: Tien-Hao Chang, Guangdong (CN); Huan Liu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 226 days.

(21) Appl. No.: 14/901,051

(22) PCT Filed: Oct. 23, 2015

(86) PCT No.: PCT/CN2015/092763
§ 371 (c)(1),
(2) Date: Dec. 27, 2015

(87) PCT Pub. No.: WO2017/049702
PCT Pub. Date: Mar. 30, 2017

(65) Prior Publication Data
US 2017/0199421 A1   Jul. 13, 2017

(30) Foreign Application Priority Data
Sep. 22, 2015   (CN) .......................... 2015 1 0608888

(51) Int. Cl.
*G02F 1/1335* (2006.01)
*G02F 1/1362* (2006.01)

(52) U.S. Cl.
CPC .. *G02F 1/133512* (2013.01); *G02F 1/136286* (2013.01); *G02F 2201/40* (2013.01)

(58) Field of Classification Search
CPC ........... G02F 2201/40; G02F 1/136213; G02F 1/136209; G02F 1/134363;
(Continued)

(56) References Cited

U.S. PATENT DOCUMENTS

| 6,724,443 B1* | 4/2004 | Sano | ................. G02F 1/136213 349/38 |
| 2004/0135939 A1* | 7/2004 | Luo | ................... G02F 1/136209 349/110 |

(Continued)

FOREIGN PATENT DOCUMENTS

| CN | 1983604 A | 6/2007 |
| CN | 101430463 A | 5/2009 |

(Continued)

*Primary Examiner* — Huyen Ngo
(74) *Attorney, Agent, or Firm* — Andrew C. Cheng

(57) ABSTRACT

The present invention provides a pixel structure, comprising a pixel layer and data lines, wherein the pixel layer comprises a plurality of pixel areas, and each of the pixel areas comprises an upper area and a lower area, and one lateral side of the upper area and one lateral side of the lower area are respectively provided with one keel, and the pixel layer and the data lines are located in different layers, and projections of the data lines at the pixel layer coincide with the keels. By employing the keels in the pixel areas to cover the data lines under the pixel areas, the data lines can shield light for one lateral side of the pixel areas where the keels are provided for achieving the technical result of reducing the non-display area, increasing the display area and raising the aperture ratio.

9 Claims, 4 Drawing Sheets

(58) Field of Classification Search
CPC ..... G02F 1/133512; G02F 2001/13606; H01L 27/124; H01L 29/78633
See application file for complete search history.

(56) References Cited

U.S. PATENT DOCUMENTS

| | | |
|---|---|---|
| 2007/0059855 A1 | 3/2007 | Shih |
| 2011/0063535 A1* | 3/2011 | Chang ............... G02F 1/133512 349/37 |
| 2012/0050656 A1* | 3/2012 | Liu ....................... G02F 1/1343 349/139 |
| 2013/0314658 A1 | 11/2013 | Park |
| 2015/0187856 A1* | 7/2015 | Park .................... H01L 27/3272 257/40 |

FOREIGN PATENT DOCUMENTS

| | | |
|---|---|---|
| CN | 101782704 A | 7/2010 |
| CN | 103399442 A | 11/2013 |
| CN | 204009303 U | 12/2014 |
| KR | 20020022974 | 3/2002 |

* cited by examiner

PIXEL STRUCTURE HAVING TRUNK OVERLAPPING DATA LINES AND LIQUID CRYSTAL DISPLAY AND ELECTRONIC APPARATUS USING THE PIXEL STRUCTURE

CROSS REFERENCE

This application claims the priority of Chinese Patent Application No. 201510608888.1, entitled "Pixel structure, liquid crystal display and electronic apparatus", filed on Sep. 22, 2015, the disclosure of which is incorporated herein by reference in its entirety.

FIELD OF THE INVENTION

The present invention relates to a pixel structure of a liquid crystal display, and more particularly to a pixel structure with high aperture ratio.

BACKGROUND OF THE INVENTION

With the development of the electronic technology, and more particularly with the population of the portable electronic products in daily life, the requirements for the display device of low power consumption increases day by day. The Liquid Crystal Display (LCD) has benefits of low power consumption, thin thickness and light weight, and is applicable for the electronic products and even gradually replaces the traditional Cathode Ray Tube display device.

The liquid crystal display panel generally comprises a Color Filter (CF) substrate and an Array substrate. The ratio (i.e. the aperture ratio) of the transparent area of the CF substrate and the Array substrate occupying the total display area is the main factor to influence the transmittance of the liquid crystal display panel. The aperture ratio is also an importance factor of determining the liquid crystal display performance. Thus, kinds of pixel structures are proposed to increase the aperture ratio of the pixel in the industry. The decrease of the transmittance of the liquid crystal display panel will increase the power consumption of the liquid crystal display panel and waste the manufacture cost of the liquid crystal display panel.

The pixel layer is the last layer of the Array substrate in general, which functions to directly control the electrical field and to influence the arrangement of the liquid crystal molecules in the liquid crystal display panel. The design of the pixel layer has significant effects to the transmittance and other optical properties of the panel.

FIG. 1 is a diagram of a pixel structure according to prior art. 11 represents the gate line (Gate) and the common line (Common) of the liquid crystal display panel. 12 is the data line (Data). 13 is the pixel area of the pixel layer. The pixel area comprises upper, lower, two sub areas 14. Each sub area 14 comprises a vertical trunk 15. The trunks 15 are alternately aligned in left and right in the upper, lower, two sub areas in one pixel area, i.e. the trunks 15 of the upper, lower sub areas are located at opposite sides. The projections of the trunks 15 and the data lines 12 do not overlap in the horizontal plane and shielding metal 16 is required to be correspondingly located under the areas among two sides of each pixel area and data lines.

Because the trunks, the data lines and shielding metal are all opaque, which can make the larger opaque area to the pixel as displaying and the aperture ratio is relatively smaller. Thus, the display result of the liquid crystal display panel is greatly reduced.

SUMMARY OF THE INVENTION

An objective of the present invention is to provide a pixel structure with large light transmitting area and high aperture ratio.

Another objective of the present invention is to provide a liquid crystal display utilizing the aforesaid pixel structure.

Another objective of the present invention is to provide a liquid crystal display utilizing the aforesaid liquid crystal display.

For realizing the aforesaid objective, the technical solution provided by the embodiments of the present invention is:

The pixel structure of the present invention comprises a pixel layer and data lines, wherein the pixel layer comprises a plurality of pixel areas, and each of the pixel areas comprises an upper area and a lower area, and one lateral side of the upper area and one lateral side of the lower area are respectively provided with one keel, and the pixel layer and the data lines are located in different layers, and projections of the data lines at the pixel layer coincide with the keels.

The two keels in each of the pixel areas are located at two opposite lateral sides of the pixel area.

The data lines extend from the upper area of the pixel area toward the lower area of the pixel area.

The pixel structure further comprises light shielding lines, and lateral sides of the upper area and the lower area opposite to the keels are correspondingly provided with light shielding areas, and the light shielding lines coincide with the light shielding areas.

The light shielding lines are at a lower layer of the data lines.

Overlapping parts are provided between adjacent pixel areas, and the overlapping parts coincide with the light shielding lines.

The data lines extend toward the adjacent pixel areas bypassing the overlapping parts.

The present invention further provides a liquid crystal display, comprising a pixel structure, and the pixel structure comprises a pixel layer and data lines, wherein the pixel layer comprises a plurality of pixel areas, and each of the pixel areas comprises an upper area and a lower area, and one lateral side of the upper area and one lateral side of the lower area are respectively provided with one keel, and the pixel layer and the data lines are located in different layers, and projections of the data lines at the pixel layer coincide with the keels.

The two keels in each of the pixel areas are located at two opposite lateral sides of the pixel area.

The data lines extend from the upper area of the pixel area toward the lower area of the pixel area.

The pixel structure further comprises light shielding lines, and lateral sides of the upper area and the lower area opposite to the keels are correspondingly provided with light shielding areas, and the light shielding lines coincide with the light shielding areas.

The light shielding lines are at a lower layer of the data lines.

Overlapping parts are provided between adjacent pixel areas, and the overlapping parts coincide with the light shielding lines.

The data lines extend toward the adjacent pixel areas bypassing the overlapping parts.

The present invention further provides an electronic apparatus, comprising a liquid crystal display, and the liquid crystal display comprises a pixel structure, and the pixel structure comprises a pixel layer and data lines, wherein the pixel layer comprises a plurality of pixel areas, and each of the pixel areas comprises an upper area and a lower area, and one lateral side of the upper area and one lateral side of the lower area are respectively provided with one keel, and the pixel layer and the data lines are located in different layers, and projections of the data lines at the pixel layer coincide with the keels.

The two keels in each of the pixel areas are located at two opposite lateral sides of the pixel area.

The data lines extend from the upper area of the pixel area toward the lower area of the pixel area.

The pixel structure further comprises light shielding lines, and lateral sides of the upper area and the lower area opposite to the keels are correspondingly provided with light shielding areas, and the light shielding lines coincide with the light shielding areas.

The light shielding lines are at a lower layer of the data lines.

Overlapping parts are provided between adjacent pixel areas, and the overlapping parts coincide with the light shielding lines.

The embodiments of the present invention have advantages or benefits:

In the present invention, by employing the keels in the pixel areas to cover the data lines under the pixel areas to overlap the data lines and the keels from the top view, the data lines can shield light for one lateral sides of the pixel areas where the keels are provided for achieving the technical result of reducing the non-display area, increasing the display area and raising the aperture ratio.

BRIEF DESCRIPTION OF THE DRAWINGS

In order to more clearly illustrate the embodiments of the present invention or prior art, the following figures will be described in the embodiments are briefly introduced. It is obvious that the drawings are merely some embodiments of the present invention, those of ordinary skill in this field can obtain other figures according to these figures without paying the premise.

DETAILED DESCRIPTION OF PREFERRED EMBODIMENTS

Embodiments of the present invention are described in detail with the technical matters, structural features, achieved objects, and effects with reference to the accompanying drawings as follows. It is clear that the described embodiments are part of embodiments of the present invention, but not all embodiments. Based on the embodiments of the present invention, all other embodiments to those of ordinary skill in the premise of no creative efforts obtained, should be considered within the scope of protection of the present invention.

Figure 1:
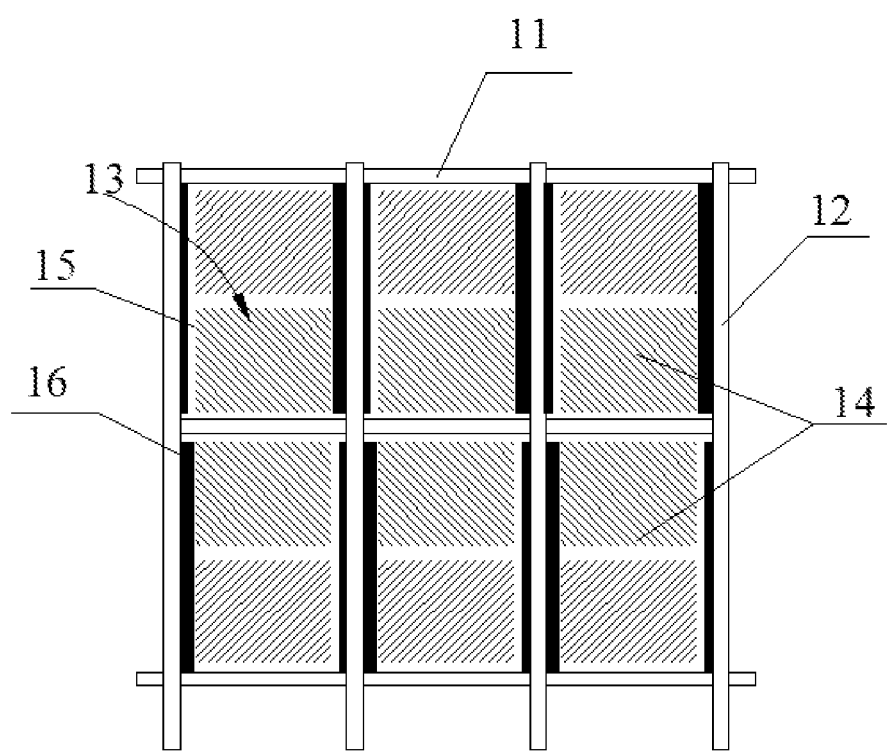
FIG. 1 is a diagram of a pixel structure according to prior art.
Figure 2:
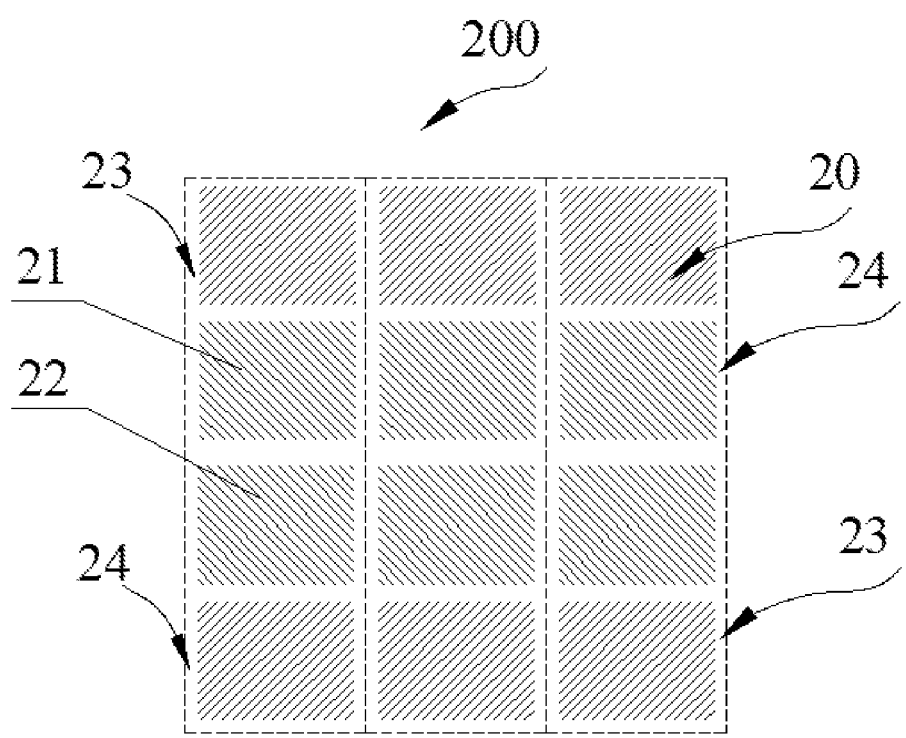
FIG. 2 is a pixel layer diagram of a pixel structure according to the present invention.
Figure 3:
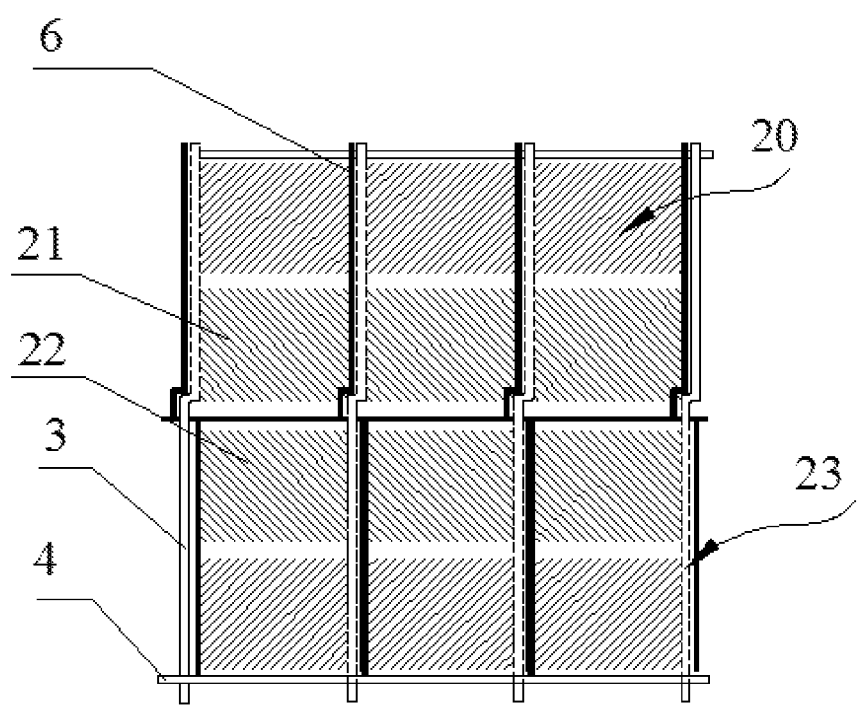
FIG. 3 is a top view diagram of the pixel structure according to the present invention.

Please refer to FIG. 2, FIG. 3. The pixel structure of the present invention comprises a pixel layer 200, data lines 3 and gate lines 4. The pixel layer 200 comprises a plurality of pixel areas 20 (the areas surrounded by the dot lines in FIG. 2). Each of the pixel areas 20 comprises an upper area 21 and a lower area 22. The upper area 21 and the lower area 22 respectively comprise pixel electrodes (not numbered). One lateral side of the upper area 21 and one lateral side of the lower area 22 are respectively provided with one keel 23 (trunk) of the pixel electrode. The upper area 21 and the lower area 22 respectively comprise one keel 23. A plurality of data lines 3 and a plurality of gate lines 4 are located under the pixel layer 200. That is to say that the pixel layer 200 and the data lines 3 are located in different layers. The pixel areas 20 are located above the areas formed by that the plurality of data lines 3 and the plurality of gate lines 4 intersect with one another. Furthermore, projections of the data lines 3 at the pixel layer 200 coincide with the keels 23. In other words, the projections of the keels 23 at the layer where the data lines 3 are entirely fall into the areas surrounded by the data lines 3.

In the present invention, the keels cover above the data lines in different layers. Both the keels and the data lines are opaque materials. Overlapping the two can effectively reduce the area of non-display area to raise the aperture ratio. Besides, the method can eliminate the step of locating the light shielding lines under the keels for reducing the manufacture cost in advance and raising the production efficiency.

Preferably, the two keels 23 in each of the pixel areas are located at two opposite lateral sides of the pixel area 20, i.e. the keels 23 of the upper area 21 and the lower area 22 are located at different sides. In this embodiment, the keel 23 of the upper area 21 is located at the left side of the upper area 21, and the keel 23 of the lower area 22 is located at the right side of the lower area 22. In other words, the electrodes of the upper area 21 and the lower area 22 face different directions.

Figure 4:
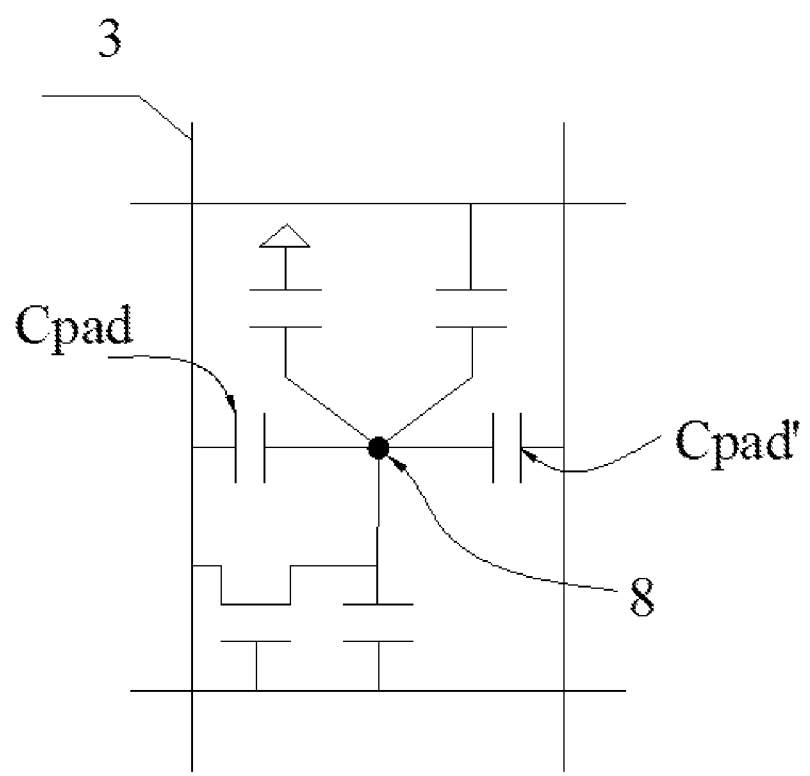
FIG. 4 is a partial circuit diagram of the pixel structure according to the present invention.

Please refer to FIG. 3 and FIG. 4. FIG. 4 is a partial circuit diagram of the pixel structure according to the present invention. The reason that the keels 23 of the upper area 21 and the lower area 22 are located at different sides is: in the present invention from the top view angle, the keels 23 at the left side of the upper area 21 and the right side of the lower area 22 respectively overlap with data lines 3 thereunder. There are coupling capacitors existing between the data lines 3 and the pixel electrodes 8. Specifically, the coupling capacitor between the left side data line 3 corresponded with the keel 23 at the left side of the upper area 21 and the pixel electrode 8 is Cpd, and if this coupling capacitor is over large, the voltage change on the data line 3 will cause the change of the pixel voltage to result in display issues, such as the image flutter, V-crosstalk and etc. Because in the present invention, the data line 3 is also arranged at the right side of the pixel area, i.e. a coupling capacitor Cpd' is also formed between the right data line 3 corresponded with the keel 23 at the right side of the lower area 22 and the pixel electrode 8. In Column Inversion, the polarities of adjacent data lines 23 are opposite, and under the gray bottom and white frame, the coupling functions of Cpd and Cpd' to the pixels due to the voltage switches of the data lines 23 can cancel out each other. Accordingly, the issues of V-crosstalk, the image flutter and etc. caused by the Cpd coupling function under the gray bottom and white frame can be improved.

Furthermore, referring to FIG. 3 still, adjacent two pixel areas 20 share one data line 3. The data line 3 is arranged in wiring from lower part of the keel 23 of the upper area 21 in one pixel area to the lower area 22 of the adjacent pixel area. In other words, the data line 3 is designed to roughly appear to be an S shape. The light shielding line 6 which is originally designed to be under the keel 23 of the adjacent pixel area can be replaced by the data line 3 of S shape. The usage of the light shielding line under the keel 23 is eliminated and the aperture ratio of the pixel structure is raised.

Furthermore, refer to FIG. 2, FIG. 3. The pixel structure further comprises light shielding lines 6. Each of the pixel areas 20 opposite to the keels 23 are correspondingly provided with light shielding areas 24, and the light shielding lines 6 coincide with the light shielding areas 24. Namely, the light shielding lines 6 are correspondingly provided under the right side of the upper area 21 and under the left side of the lower area 22 in FIG. 2. The light shielding lines 6 are employed to shield the light leak of the adjacent pixel area 20. Specifically, the light shielding lines 6 are located at the layer which is next lower to the layer where the data lines 3 are. The two are insulated with an insulation layer (not shown).

Furthermore, in the present invention, for diminishing the loading of the data line, the pixel structure utilizes the COA (Color Filter On Array) technology. In the products of COA structure, adjacent pixel areas 20 may overlay to form overlapping portions, and the overlapping portions are so called protrusions. The existence of the protrusions makes the felling directions of the liquid crystals around in chaos to generate fringes and lowers the transmittance of the product. In the present invention, the data line 3 does not overlay with the protrusion. Meanwhile, the data line 3 is designed to be a curved S shape to bypass the protrusion. Thus, a certain gap exists between the protrusion and the pixel electrode to prevent the pixel fringe generated due to the felling directions of the liquid crystals around the protrusion in chaos. Besides, the data line 3 does not overlay with the protrusion, and then the height of the protrusion will not be too tall, which is beneficial to reduce the volume of the pixel structure and to save the occupied space.

Furthermore, the protrusion should be located above the light shielding line 6. In other words, the projection of the light shielding line 6 on the pixel layer 200 coincides with the overlapping part. By setting the protrusion corresponding to the light shielding line, the light shielding line 6 shields the light for the overlapping part to promote the aperture ratio of the pixel structure in advance.

In other embodiments of the present invention, the keels 23 in the upper area 21 and the lower area 22 of the same pixel area 20 can be located at the same side. That is to say, the pixel electrodes of the upper area 21 and the lower area 22 face the same direction. Correspondingly, the light shielding line 6 is located in the pixel area 20 under the side opposite to the keel 23. In this embodiment, the data line 3 can be a straight line and correspondingly located under the keel 23, which also can function for raising the aperture ratio. However, in such design, a coupling capacitor Cpd generates between the data line and the pixel electrode. If this coupling capacitor is over large, the voltage change on the data line 3 will cause the change of the pixel voltage to result in display issues, such as the image flutter, V-crosstalk and etc. Therefore, as regarding this design, a signal shielding layer is required to be located above the pixel layer 200. The signal shielding layer can be a transparent conductive layer, which can be a conductor for coupling the coupling capacitor Cpd generated between the data line and the pixel electrode. In the practical pixel structure, the transparent conductive layer is insulated from the pixel layer 200 with the insulation layer.

Certainly, in practical application, it can be ensured that the electrical field above the pixel layer 200 will not be interfered as long as a signal shielding layer is located between the pixel layer 200 and the data line or the gate line closest thereto. In other words, in the present top gate pixel structure, the gate line is always closer to the pixel layer 200 than the data line. A coupling capacitor Cpd generates between the gate line and the pixel electrode. Therefore, it is required to locate a signal shielding layer between the gate line and the pixel layer 200.

Introduction to the pixel structure according to the present invention is provided above. The present invention further provides a liquid crystal display utilizing the aforesaid pixel structure.

It is understandable that the liquid crystal display disclosed by the present invention can be utilized in any electronic apparatuses or parts with display function, such as the cell phone, the tablet, the television, the display, the notebook, the digital camera, the navigator and et cetera.

Above are embodiments of the present invention, which does not limit the scope of the present invention. Any modifications, equivalent replacements or improvements within the spirit and principles of the embodiment described above should be covered by the protected scope of the invention.

What is claimed is:

1. A pixel structure, comprising a pixel layer and data lines, wherein the pixel layer comprises a plurality of pixel areas, and each of the pixel areas comprises an upper area and a lower area each of which has two lateral sides, wherein one of the two lateral sides of the upper area is provided with one keel and one of the two lateral sides of the lower area is provided with one keel, such that the data lines overlap the keels;

wherein each of the data lines comprises a first part that is located in an first area associated with the upper area of a first one of the plurality of pixel areas and a second part that is located in a second area associated with the lower area of a second one of the plurality of pixel areas that is immediately next to the first one of the plurality of pixel areas such that the first part and the second part are shifted away from each other in a direction in which the first and second ones of the plurality of pixels are arranged.

2. The pixel structure according to claim 1, wherein the two keels of the upper area and the lower area of each of the plurality of pixel areas are respectively located at different ones of the two lateral sides of the upper area and the lower area the pixel area such that the keel of the upper area and the keel of the lower area are opposite to each other.

3. The pixel structure according to claim 2, wherein the pixel structure further comprises light shielding lines, such that one of the light shielding lines is located on one of the lateral sides of the upper area that is opposite to the keel of the upper area and one of the light shielding lines is located on one of the lateral sides of the lower area that is opposite to the keel of the lower area, the light shielding line and the keel of the upper area being opposite to each other, the light shielding line and the keel of the lower area being opposite to each other.

4. A liquid crystal display, comprising a pixel structure, which comprises a pixel layer and data lines, wherein the pixel layer comprises a plurality of pixel areas, and each of the pixel areas comprises an upper area and a lower area each of which has two lateral sides, wherein one of the two lateral sides of the upper area is provided with one keel and one of the two lateral sides of the lower area is provided with one keel, such that the data lines overlap the keels;

wherein each of the data lines comprises a first part that is located in an first area associated with the upper area of a first one of the plurality of pixel areas and a second part that is located in a second area associated with the lower area of a second one of the plurality of pixel areas that is immediately next to the first one of the plurality of pixel areas such that the first part and the second part are shifted away from each other in a direction in which the first and second ones of the plurality of pixels are arranged.

5. The liquid crystal display according to claim 4, wherein the two keels of the upper area and the lower area of each of the plurality of pixel areas are respectively located at different ones of the two lateral sides of the upper area and the lower area the pixel area such that the keel of the upper area and the keel of the lower area are opposite to each other.

6. The liquid crystal display according to claim 5, wherein the pixel structure further comprises light shielding lines, such that one of the light shielding lines is located on one of the lateral sides of the upper area that is opposite to the keel of the upper area and one of the light shielding lines is located on one of the lateral sides of the lower area that is opposite to the keel of the lower area, the light shielding line and the keel of the upper area being opposite to each other, the light shielding line and the keel of the lower area being opposite to each other.

7. An electronic apparatus, comprising a liquid crystal display, which comprises a pixel structure, and the pixel structure comprising a pixel layer and data lines, wherein the pixel layer comprises a plurality of pixel areas, and each of the pixel areas comprises an upper area and a lower area each of which has two lateral sides, wherein one of the two lateral sides of the upper area is provided with one keel and one of the two lateral sides of the lower area is provided with one keel, such that the data lines overlap the keels;

wherein each of the data lines comprises a first part that is located in an first area associated with the upper area of a first one of the plurality of pixel areas and a second part that is located in a second area associated with the lower area of a second one of the plurality of pixel areas that is immediately next to the first one of the plurality of pixel areas such that the first part and the second part are shifted away from each other in a direction in which the first and second ones of the plurality of pixels are arranged.

8. The electronic apparatus according to claim 7, wherein the two keels of the upper area and the lower area of each of the plurality of pixel areas are respectively located at different ones of the two lateral sides of the upper area and the lower area the pixel area such that the keel of the upper area and the keel of the lower area are opposite to each other.

9. The electronic apparatus according to claim 8, wherein the pixel structure further comprises light shielding lines, such that one of the light shielding lines is located on one of the lateral sides of the upper area that is opposite to the keel of the upper area and one of the light shielding lines is located on one of the lateral sides of the lower area that is opposite to the keel of the lower area, the light shielding line and the keel of the upper area being opposite to each other, the light shielding line and the keel of the lower area being opposite to each other.

* * * * *